(12) United States Patent
Johann et al.

(10) Patent No.: US 12,275,459 B2
(45) Date of Patent: Apr. 15, 2025

(54) CARGO FLOOR FOR A MOTOR VEHICLE

(71) Applicant: Dr. Ing. h.c. F. Porsche Aktiengesellschaft, Stuttgart (DE)

(72) Inventors: Michael Johann, Tamm (DE); Nico Wollitzer, Knittlingen (DE); Felix Adam, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 222 days.

(21) Appl. No.: 18/108,899

(22) Filed: Feb. 13, 2023

(65) Prior Publication Data
US 2023/0312023 A1 Oct. 5, 2023

(30) Foreign Application Priority Data
Mar. 29, 2022 (DE) .................... 10 2022 107 379.3

(51) Int. Cl.
| | |
|---|---|
| *B32B 3/12* | (2006.01) |
| *B32B 5/02* | (2006.01) |
| *B32B 5/26* | (2006.01) |
| *B32B 27/12* | (2006.01) |
| *B32B 27/32* | (2006.01) |
| *B62D 25/20* | (2006.01) |
| *B62D 29/04* | (2006.01) |

(52) U.S. Cl.
CPC ............. *B62D 29/041* (2013.01); *B32B 3/12* (2013.01); *B32B 5/028* (2013.01); *B32B 5/26* (2013.01); *B32B 27/12* (2013.01); *B32B 27/32* (2013.01); *B62D 25/20* (2013.01); *B32B 2260/021* (2013.01); *B32B 2260/046* (2013.01); *B32B 2262/02* (2013.01); *B32B 2262/101* (2013.01); *B32B 2262/106* (2013.01); *B32B 2605/00* (2013.01)

(58) Field of Classification Search
None
See application file for complete search history.

(56) References Cited

U.S. PATENT DOCUMENTS

| | | | |
|---|---|---|---|
| 10,343,380 B2 | 7/2019 | Curfman et al. | |
| 11,180,200 B2 | 11/2021 | Baranowski et al. | |
| 2019/0077321 A1* | 3/2019 | Baranowski | ............. B60R 5/04 |
| 2021/0016537 A1 | 1/2021 | Naegele | |

FOREIGN PATENT DOCUMENTS

| | | |
|---|---|---|
| DE | 102012004109 A1 | 9/2013 |
| DE | 102015201712 A1 | 8/2016 |
| DE | 102019214027 A1 | 3/2020 |
| DE | 112018006411 T5 | 2/2021 |
| DE | 102020124669 A1 | 3/2022 |
| WO | 2021123112 A1 | 6/2021 |

* cited by examiner

*Primary Examiner* — Alexander S Thomas
(74) *Attorney, Agent, or Firm* — Buchanan Ingersoll & Rooney PC

(57) ABSTRACT

A cargo floor, in particular a trunk or storage floor, for a motor vehicle. The cargo floor includes a layer-shaped construction with a core layer, a first reinforcement layer and a second reinforcement layer. The core layer is arranged between the first reinforcement layer and the second reinforcement layer and includes a honeycomb structure produced in particular from polypropylene (PP). It is conceivable that the first reinforcement layer and/or the second reinforcement layer each include a meshwork made of a plurality of thermoplastic continuous fiber tapes (UD tapes).

20 Claims, 3 Drawing Sheets

CARGO FLOOR FOR A MOTOR VEHICLE

CROSS-REFERENCE TO RELATED APPLICATION

This application claims priority to German Patent Application No. 10 2022 107 379.3, filed Mar. 29, 2022, the content of such application being incorporated by reference herein in its entirety.

FIELD OF THE INVENTION

The invention relates to a cargo floor for a motor vehicle.

BACKGROUND OF THE INVENTION

DE 11 2018 006 411 T5, which is incorporated by reference herein, discloses a cargo floor for a motor vehicle, which is used, for example, as a trunk floor and/or a rear storage unit. The cargo floor comprises a rigid carrier over-molded by a plastic layer. The carrier is designed in a layer-like fashion in the form of a sandwich construction, which comprises a core layer having a honeycomb structure and at least one cover layer arranged on the core layer in the form of a glass fiber mat. However, due to the variety of materials used, the cargo floor requires a comparatively high effort in order to recycle the cargo floor as well as to manufacture it.

A similar cargo floor is disclosed in U.S. Pat. No. 10,343,380 B2, which is incorporated by reference herein. Here, too, the problem arises that the cargo floor requires a considerable effort to be recycled and has a comparatively high weight.

SUMMARY OF THE INVENTION

The cargo floor according to aspects of the invention, in particular a trunk or storage floor, for a motor vehicle, comprises a layer-shaped construction with a core layer, a first reinforcement layer and a second reinforcement layer, wherein the core layer is arranged between the first reinforcement layer and the second reinforcement layer and comprises a honeycomb structure produced in particular from polypropylene (PP).

The cargo floor according to aspects of the invention is wherein the first reinforcement layer and/or the second reinforcement layer each comprise a meshwork of a plurality of thermoplastic continuous fiber tapes (UD tapes). This results in the advantage that the cargo floor is particularly weight-saving and at the same time stable and resilient compared to known cargo floors. In addition, the advantageous combination of design structure and materials used requires less design space for the cargo floor, so that its overall height can be reduced in an advantageous manner. In addition, the overall design of the cargo floor according to aspects of the invention significantly improves its recyclability, because the use of durable plastics can be omitted.

In connection with the present invention, the term "thermoplastic continuous fiber tape" (UD tape) is to be understood to mean tape made of a fiber-reinforced thermoplastic having a predefined length and a predefined width. This tape may have been produced in an upstream manufacturing process using a so-called "spread tow method," in which a roving formed from the starting material is spliced into a thin, wide strip that later forms the UD tape.

According to a preferred further development, it is provided that the UD tapes are inhomogeneously distributed within the meshwork, in particular spaced apart unevenly. In other words, the meshwork preferably has an inhomogeneous distribution of the UD tapes, in which the UD tapes are at least regionally unevenly spaced apart from one another so that the UD tapes of different regions of the meshwork have different distances with respect to other regions of the meshwork in at least one spatial direction. In this respect, the inhomogeneous distribution means that the meshwork comprises sections in which the density of the meshwork (distance of adjacent tapes in at least one spatial direction) is purposefully selected differently, i.e. more or less than in other portions. However, a tolerance, if any, due to manufacturing is not to be understood as an inhomogeneous distribution. The inhomogeneous distribution of the UD tapes advantageously enables a material-saving and thus inexpensive production of the cargo floor, wherein, by means of the distribution of the UD tapes, the resiliency of the expectedly highly mechanically stressed regions of the cargo floor is specifically adaptable to the corresponding requirements.

For example, the cargo floor has a higher density of UD tapes (low distance of the DU tapes to one another) in those regions where a particularly high load is to be expected in accordance with the intended use and a high stability is required as a result compared to those regions (e.g. peripheral regions) in which a low load is to be expected with the intended use and thus only a lower stability is required (large distance of the UD tapes relative to one another).

Preferably, the UD tapes are distributed inhomogeneously within the meshwork such that the distance of the UD tapes arranged in a first region of the meshwork relative to one another at least differs from the distance of the UD tapes arranged in a second region of the meshwork relative to one another. The distance of the UD tapes relative to one another is in particular the average distance (average) of the UD tapes arranged in this region. As already mentioned above, the resilience of the cargo floor is thus advantageously adaptable to the respective requirements in accordance with the intended use, and the cargo floor can be manufactured at the same time in a material-saving and thus cost-efficient manner. For example, the distance of the UD tapes in the first region is two or three times as large as the distance of the UD tapes in the second region.

Preferably, it is provided that the meshwork is respectively incorporated into a matrix. This means that the meshwork is at least partially embedded in the matrix so that the reinforcement layer comprises the matrix as well as the meshwork at least partially embedded therein. This allows for a fluid-tight formation of the reinforcement layer. Because it is embedded in the matrix, the meshwork is furthermore advantageously protected against harmful environmental factors. The matrix, in turn, is advantageously stabilized by the meshwork, so that a resilient, yet simple and inexpensive, reinforcement layer for the cargo floor is provided. In particular, the matrix comprises polypropylene (PP). Polypropylene is an inexpensive and highly resilient plastic, which is particularly well-suited as a material for the cargo floor.

According to a preferred further development, the UD tapes are at least partially fiber-reinforced. Advantageously, this further improves the resilience of the UD tapes and thus the stability of the meshwork or the reinforcement layer. In particular, the UD tapes are reinforced with carbon, glass, or natural fibers. The selection of the fibers used is preferably based on the individual requirements for the cargo floor. The resilience of the UD tapes or stability of the reinforcement layer is thus advantageously adaptable to the individual requirements. To strengthen the UD tapes, the fibers are incorporated into a tape matrix of the UD tapes, i.e. substantially the thermoplastic material that forms a base material of the UD tapes. Preferably, the proportion of fibers is at most 70%. Advantageously, the selection of the actual fiber content is also carried out as a function of the respective requirements on the cargo floor, so that the adjustability or flexibility of the cargo floor with respect to the individual requirements is improved again.

It is preferably provided that the core layer is fixedly bonded to the first reinforcement layer and the second reinforcement layer and/or that the core layer, in particular the honeycomb structure, is made of polypropylene. By permanently joining the layers together, the stability and durability of the cargo floor are further improved. In particular, the connection is a material-locking connection, in which the layers are joined together, in particular welded, e.g. by thermal means or by means of pressure and/or temperature. A use of polypropylene melt adhesives is also conceivable. The use of the polypropylene melt adhesives is particularly advantageous when the core layer is also formed from polypropylene, because the material composite of the cargo floor (core layer and reinforcement layers as well as their composite) is then substantially continuous polypropylene and is thereby particularly simple and favorable for recycling. The manufacture of the core layer, in particular the honeycomb structure, out of polypropylene further offers the advantage that the core layer is lightweight and resilient as well as inexpensive to manufacture, because polypropylene, as already mentioned above, has particularly well-suited material properties for a cargo floor.

Particularly preferably, a cover layer, in particular a textile layer, is arranged on the outside of the first reinforcement layer and/or the second reinforcement layer. Advantageously, this protects the reinforcement layer against damage while simultaneously enhancing the visual appearance of the cargo floor. In this respect, the cover layer is preferably arranged on reinforcement layer that, when used as intended, faces a user and is thus usable by the user, for example for storing objects. For example, textile top cloths, in particular dilour or tufted velour, can be used as the cover layer or textile layer. These materials are inexpensive, resilient, and also have a particularly high-quality visual appearance. Preferably, a thickness of the textile layer is 2-6 mm. In this thickness range, the cover layer is durable and yet configured so as to be material-saving and thus inexpensive. Preferably, the cover layer is joined to the reinforcement layer in a material-, form-, or force-fit lock, for example connected to the reinforcement layer by thermal means (welded), pinned to it (fastened), riveted, or screwed to it.

It is preferably provided that at least one attachment part, in particular a handle element, can be fastened or fastened to the cargo floor. This results in the advantage that the handling and/or the usability or functionality of the cargo floor is further improved. For example, the cargo floor is particularly easy for the user to handle due to the handle element.

According to a preferred further development, the cargo floor, for the purpose of fastening the attachment part, comprises at least one retaining element inserted into the cargo floor, in particular into the core layer, which is configured so as to fasten the attachment part to the cargo floor by cooperation with at least one fastening element. In particular, the retaining element is a plastic insert, and the fastening element is a fastening bolt. The attachment is thus easily attachable to the cargo floor or, after fastening, stably and securely held to the cargo floor.

It is preferably provided that the core layer has a thickness of 8-20 mm and the reinforcement layers each have a thickness of 0.1-0.3 mm and/or that the UD tapes each have a thickness of 0.15 mm and a width of 20-30 mm. In this range of dimension, the cargo floor in its entirety is designed so as to be material-saving and thus cost-efficiently manufactured and yet stable and load-bearing.

Preferably, the cargo floor is fabricated in a manufacturing process with a plurality of at least partially different process steps relative to one another.

In a first series of process steps, the core layer of honeycomb structure is thermally connected to the meshwork of UD tapes, preferably via a pressing tool.

In a second series of process steps, at least one of the reinforcement layers is subsequently equipped with the cover layer in the form of textile top cloth, wherein the textile top cloths may be cut in advance and then joined to the reinforcement layers.

In a third series of process steps, the cargo floor is subsequently finished, wherein in particular the edges of which (edge fold) are processed, for example, grounded or varnished, and optionally at least one attachment part is fastened to the cargo floor.

The motor vehicle comprises a cargo floor and is characterized in that the cargo floor is configured according to aspects of the invention as already described above. This results in the advantages already mentioned in this regard.

BRIEF DESCRIPTION OF THE DRAWINGS

Further advantageous configurations will emerge from the following description and the drawings. The drawings show.

DETAILED DESCRIPTION OF THE INVENTION

Figure 1:
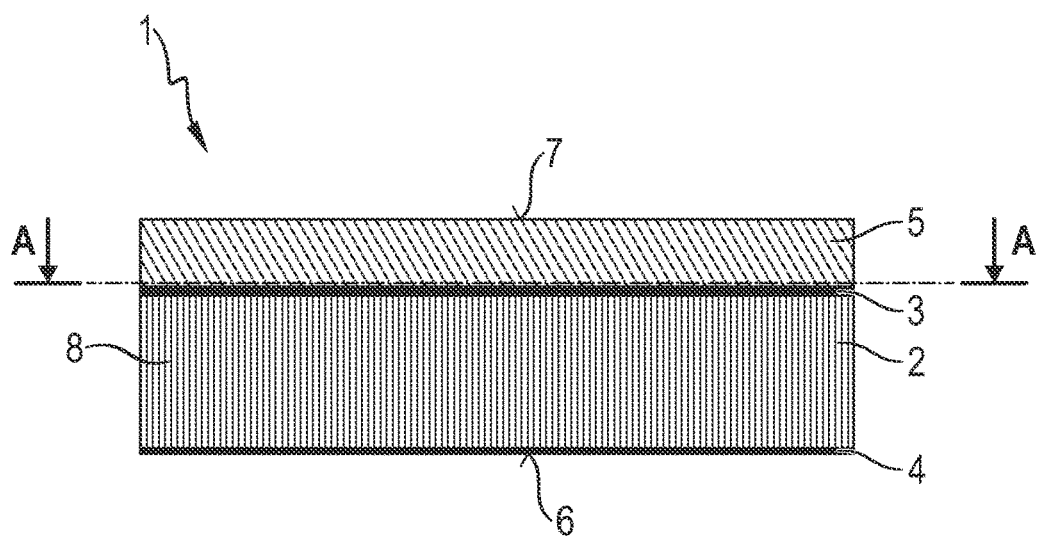
FIG. 1 a schematic view of a cross-section through an advantageous cargo floor.

FIG. 1 shows a schematic view of a cross-section through an advantageous cargo floor 1. In the present case, the cargo floor 1 is configured as a trunk or storage floor for a motor vehicle (not shown). The cargo floor 1 is constructed in a layered fashion and comprises a core layer 2, a first reinforcement layer 3, a second reinforcement layer 4 and in the present case a cover layer 5.

As can be seen in FIG. 1, the core layer 2 is arranged between the first reinforcement layer 3 and the second reinforcement layer 4 and is connected to the reinforcement layers 3, 4 according to the present embodiment example in a material-locking manner by thermal welding. In this respect, the reinforcement layers, 3, 4, each face or are connected to a surface of the core layer 2 and face away from the core layer 2 with a further surface opposite the corresponding surface.

In the present case, the cover layer 5 is arranged on the surface of the first reinforcement layer 3 facing away from the core layer 2 and is also connected to the first reinforcement layer 3 by thermal welding. Due to this layer-like construction, the top side of the second reinforcement layer 4 facing away from the core layer 2 forms a bottom side 6 and a surface of the cover layer 5 facing away from the first reinforcement layer 3 forms a top side 7 of the cargo floor 1. In this respect, the cargo floor 1 is arranged in the motor vehicle according to the intended use, such that the upper side 7 is primarily accessible to and can be used by a user of the motor vehicle, for example for storing objects.

According to the present embodiment example, the cover layer 5 is a textile layer, preferably dilour or tufted velour, in order to ensure a high-quality visual appearance of the cargo floor 1. The thickness of the cover layer 5 or textile layer is preferably 2-6 mm. In this size range, the cover layer 5 is configured to be material-saving and still has sufficient resiliency.

The thickness of the reinforcement layers 3, 4 is 0.1-0.3 mm and the thickness of the core layer is 8-20 mm, respectively. The core layer 2 thus constitutes an essential element for the shaping and stability of the cargo floor 1. The core layer 2 comprises a honeycomb structure 8, made of polypropylene (PP) in the present case, in order to provide both a sufficient load capacity and stability as well as a material or weight-saving configuration and thus a cost-efficient production of the core layer 2. Optionally, the honeycomb structure 8 can be integrated into a protective matrix, e.g. resin. To protect the core layer 2 against environmental factors as well as to improve its stability and resiliency, the reinforcement layers 3, 4, discussed in further detail below, are provided.

Figure 2A:
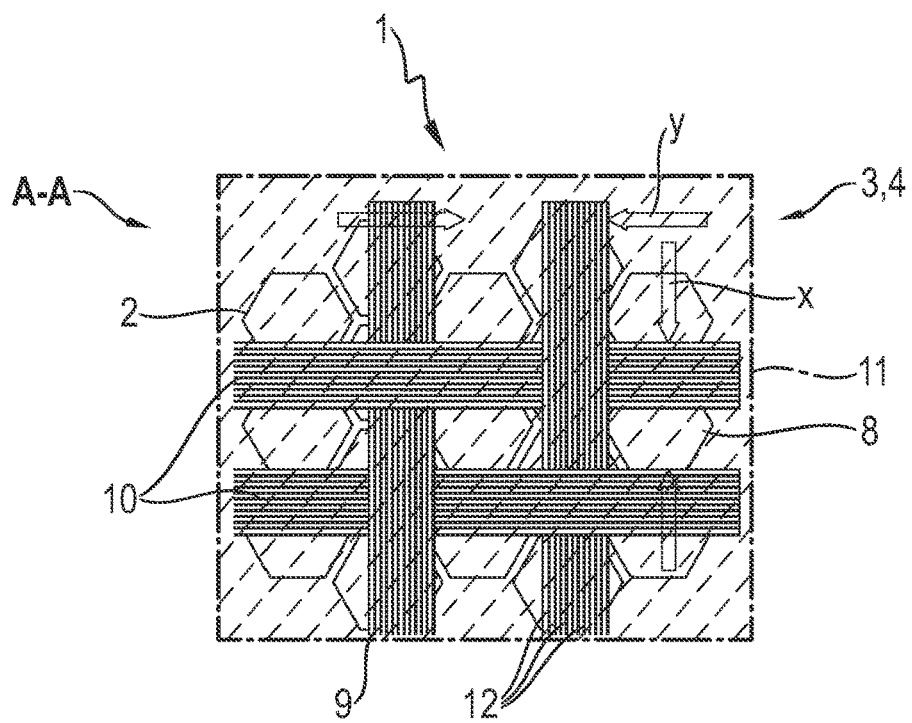
FIG. 2A a further schematic view of a cross-section through the cargo floor according to a section line A-A of FIG. 1, FIG. 2B an exemplary view of a reinforcement layer of the cargo floor in a perspective view, FIG. 3A the view from FIG. 1 according to a preferred further development of the cargo floor, and FIG. 3B the view from FIG. 3A according to a preferred embodiment example.

FIG. 2A shows a top plan view of the surface of the first reinforcement layer 3 facing away from the core layer 2 according to a section line A-A from FIG. 1. The second reinforcement layer 4 is basically identical to the first reinforcement layer 3, so that the following explanations can also be applied to the second reinforcement layer 4.

In order to form the reinforcement layers 3, 4 and thus the cargo floor 1 to be weight-saving and stable, it is provided that the reinforcement layers 3, 4 each comprise a meshwork 9 of a plurality of thermoplastic continuous fiber tapes (UD tapes) 10. As can be seen in the schematic diagram of FIG. 2A, UD tapes 10 for forming the meshwork 9 are interwoven and arranged spaced apart from one another within the meshwork 9. In this respect, UD tapes 10 have a fixed or fixable distance relative to one another in the plane of the meshwork 9 in both a first spatial direction X and a second spatial direction Y.

The reinforcement layers 3, 4 further comprise a matrix 11, shown schematically in FIG. 2A using dashed lines only, in which the meshwork is at least partially embedded. In this respect, the reinforcement layers 3, 4 are formed from the respective matrix 11 as well as the respective meshwork 9 at least partially embedded therein. The matrix 11 is formed from polypropylene according to the present embodiment example. Because both the honeycomb structure 8 and the matrix 11 are thus made of polypropylene, a substantially homogeneous material transition between the individual layers of the cargo floor 1 is formed by the material-locking connection of the reinforcement layers 3, 4 to the core layer 2. This advantageously optimizes the recyclability of the cargo floor 1.

UD tapes 10 were produced or tailored in an upstream manufacturing process (see definition at the beginning of the application) and embedded into matrix 11. Preferably, the UD tapes 10 each have a thickness of 0.15 mm and a width of 20-30 mm. In order to further improve the resilience of the UD tapes 10, it is conceivable that the UD tapes 10 are reinforced at least in portions by carbon, glass, or natural fibers 12. Preferably, a percentage of the fibers 12 in the UD tapes 10 is at most 70%. The specific fibrous material is preferably selected as a function of the expected loads for the cargo floor 1.

As already mentioned above, UD tapes 10 have a fixed or fixable distance relative to one another within the meshwork 9. In order to improve the stability of the reinforcement layers 3, 4 and the cargo floor 1, as well as for the simultaneous saving of material and thus weight, it is provided that the UD tapes 10 are inhomogeneously distributed within the meshwork 9.

Figure 2B:
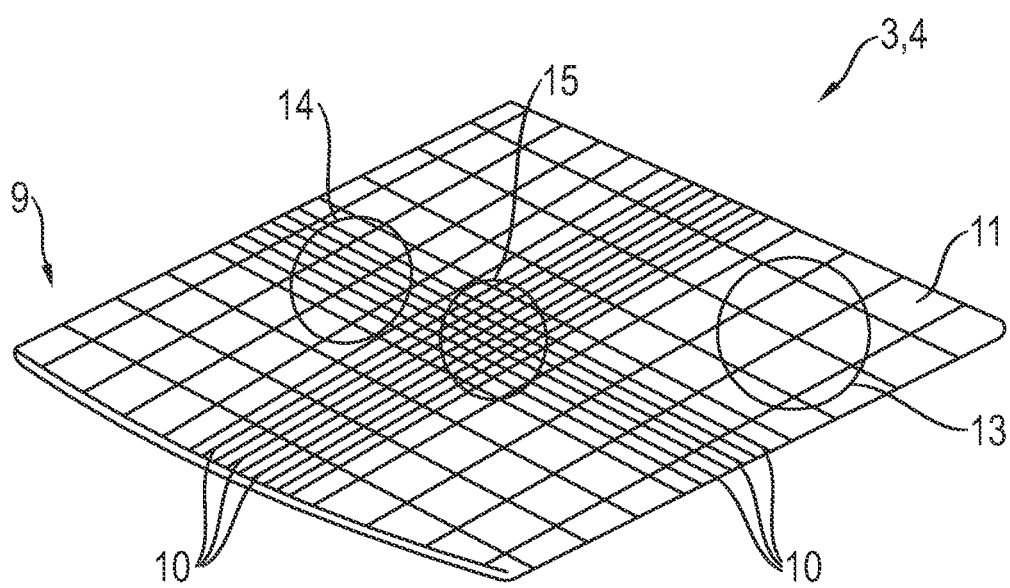

FIG. 2B shows a perspective view of one of the reinforcement layers 3, 4 in a simplified illustration. As can be seen in FIG. 2B, UD tapes 10 are distributed inhomogeneously within the meshwork 9 such that the UD tapes 10 arranged in a first region 13 of the meshwork 9 have a different, in particular average, distance relative to one another when compared to the UD tapes 10 arranged in a second region 14 of the meshwork 9. For example, the distance of the UD tapes 10 of the first region 13 is three times as large as the distance of the UD tapes 10 of the second region 14. The distance of the UD tapes 10 in the respective regions 13, 14 can be identical, but also different, in the X and Y directions.

According to the embodiment example shown in FIG. 2B, the meshwork 9 further comprises a third region 15 in which the UD tapes arranged at a smaller distance to one another (arranged at a distance corresponding to the region 14) intersect perpendicularly, in particular. In this respect, the UD tapes 10 are unevenly spaced apart within the entirety of the meshwork 9, such that the UD tapes 10 of different regions 13, 14, 15 of the meshwork 9 have different distances relative to one another with respect to other regions 14, 15, 13. In this respect, in the present case, the inhomogeneous distribution of UD tapes 10 is not to be understood as a manufacturing-related tolerance, but rather as a targeted variation of the distances of UD tapes 10 in different regions 13, 14, 15 of the meshwork 9.

In other words, the meshwork 9 comprises regions 13, 14, 15 in which the density of the meshwork 9 (distance of adjacent UD tapes 10 in the X and/or Y direction) is selected differently in a targeted manner, i.e. more or less than in other regions 14, 15, 13. Due to the inhomogeneous distribution of the UD tapes 10, the resilience of the reinforcement layers 3, 4 and the cargo floor 1 is selectively adaptable to the loads that are expected when the cargo floor 1 is used as intended. For example, the density of the UD tapes 10 in the middle of the reinforcement layers 3, 4, in the present case the third section 15, is highest, as it is expected that the highest force will be applied to the cargo floor 1 in the third region 15 when the cargo floor 1 is used as intended. In the edge regions of the cargo floor 1, in the present case the first region 13, on the other hand, such a high degree of force is not expected, so that too high a load capacity is not necessary here, and, to this extent, the density of the UD tapes 10 in the first region 13 can be selected lower in order to save material and thus cost and weight.

Figure 3A:
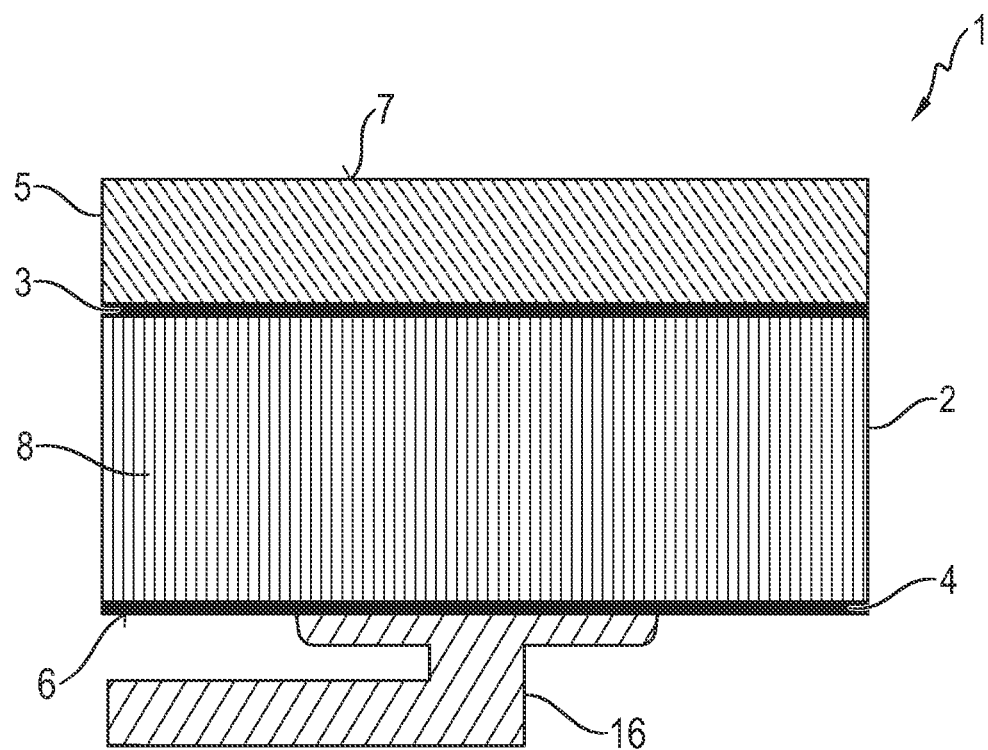

Similar to FIG. 1, FIG. 3A shows a cross-section through the cargo floor 1 according to a preferred further development of the cargo floor 1. Advantageously, it is provided here that at least one attachment part 16, in particular a handle element, can be fastened or fastened to the cargo floor 1. The attachment part 16 is arranged at the lower side 6 and fastened to the second reinforcement layer 4, which forms the lower side 6, preferably in a non-destructively and releasable manner, for example glued. Alternatively, the attachment part 16 is preferably fastened to the cargo floor 1 with a force-fit or at least positive lock.

Figure 3B:
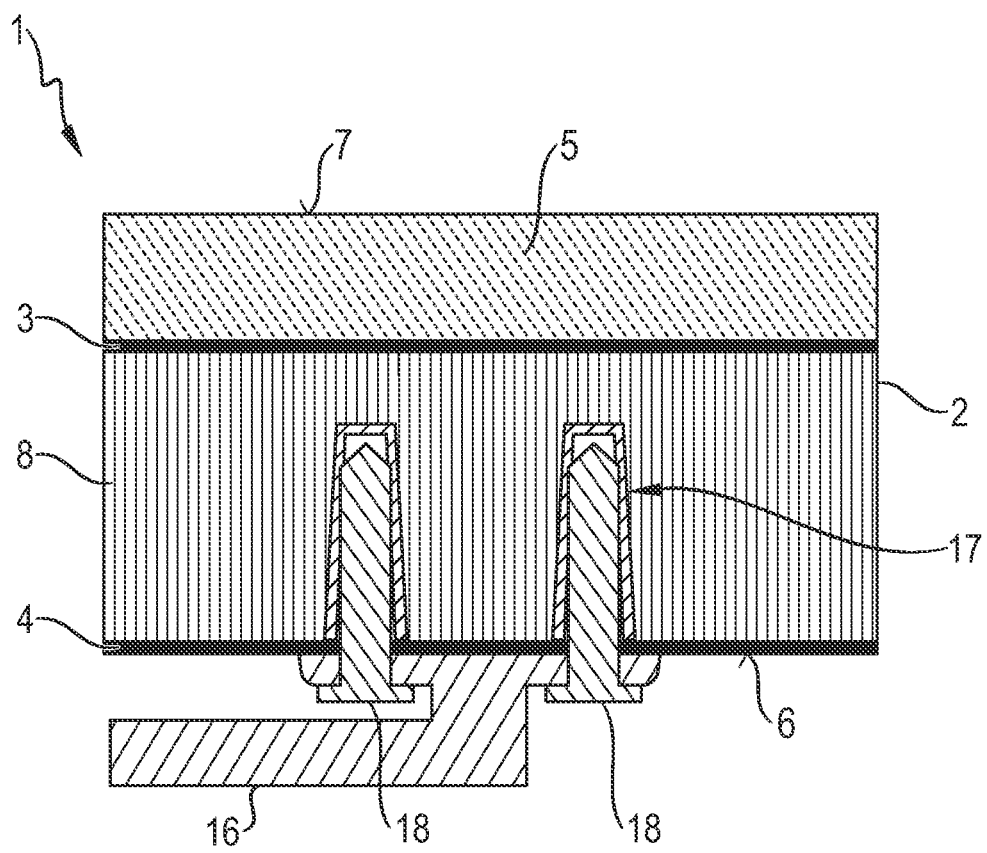

FIG. 3B shows a preferred embodiment example for fastening the attachment part 16. According to the embodiment example shown in FIG. 3B, it is provided that the cargo floor 1, for the purpose of fastening the attachment part 16, comprises at least one retaining element 17 inserted into the cargo floor 1, which is configured so as to fasten the attachment part 16 to the cargo floor 1 by cooperation with at least one fastening element 18.

In the present case, the retaining element 17 is a plastic insert inserted into the core layer 2 or the honeycomb structure 8 and connected therein by means of welding, for example, and the fastening element 18 is a fastening bolt or alternatively a fastening screw that cooperates with a thread of the plastic insert that is not shown in the present case. The fastening of the attachment part 16 by means of the retaining element 17 and the fastening element 18 advantageously enables a stable and loss-proof arrangement of the attachment part 16 on the cargo floor 1, which in particular allows a non-destructive disassembly of the attachment part 16. In the example, the attachment part 16 is fastened to the cargo floor 1 by means of two retaining elements 17 and two fastening elements 18.

What is claimed is:

1. A cargo floor for a motor vehicle, said cargo floor comprising:
   a first reinforcement layer,
   a second reinforcement layer, and
   a core layer arranged between the first reinforcement layer and the second reinforcement layer, wherein the core layer comprises a honeycomb structure composed of polypropylene (PP),
   wherein the first reinforcement layer and/or the second reinforcement layer each comprise a meshwork composed of a plurality of thermoplastic continuous fiber tapes (TCF tapes).

2. The cargo floor according to claim 1, wherein the TCF tapes are inhomogeneously distributed within the meshwork.

3. The cargo floor according to claim 1, wherein the TCF tapes are unevenly spaced apart from one another.

4. The cargo floor according to claim 1, wherein the TCF tapes are distributed inhomogeneously within the meshwork such that an average distance separating adjacent TCF tapes arranged in a first region of the meshwork differs from the average distance separating adjacent TCF tapes that are arranged in a second region of the meshwork.

5. The cargo floor according to claim 1, wherein the meshwork is machined into a matrix comprising polypropylene.

6. The cargo floor according to claim 1, wherein the TCF tapes are at least partially fiber-reinforced with carbon, glass, or natural fibers.

7. The cargo floor according to claim 1, wherein the core layer is fixedly connected to the first reinforcement layer and the second reinforcement layer in a material-locking manner.

8. The cargo floor according to claim 1, further comprising a cover layer, in the form of a textile layer, arranged on the first reinforcement layer and/or the second reinforcement layer on an outside and connected to the first reinforcement layer and/or the second reinforcement layer by a material or friction lock.

9. The cargo floor according to claim 8, wherein the first reinforcement layer is sandwiched between the cover layer and the core layer.

10. The cargo floor according to claim 9, wherein the first reinforcement layer is connected to the cover layer by thermal welding.

11. The cargo floor according to claim 1, further comprising at least one attachment part, in the form of a handle element, that is fastened to the cargo floor.

12. The cargo floor according to claim 11, further comprising at least one retaining element inserted into the core layer of the cargo floor, the retaining element being configured for fastening the attachment part to the cargo floor by cooperation with at least one fastening element.

13. The cargo floor according to claim 12, wherein the retaining element is a plastic insert.

14. The cargo floor according to claim 12, wherein the fastening element is a fastening bolt.

15. The cargo floor according to claim 1, wherein the cargo floor is either a trunk floor or a storage floor.

16. The cargo floor according to claim 1, wherein the honeycomb structure of the core layer is composed of polypropylene.

17. A motor vehicle having a cargo floor according to claim 1.

18. The cargo floor according to claim 1, wherein the first reinforcement layer and the second reinforcement layer each comprise a meshwork composed of a plurality of thermoplastic continuous fiber tapes (TCF tapes).

19. The cargo floor according to claim 1, wherein the TCF tapes are distributed inhomogeneously within the meshwork such that an average distance separating adjacent TCF tapes arranged in a central region of the meshwork is less than an average distance separating adjacent TCF tapes that are arranged in an edge region of the meshwork.

20. The cargo floor according to claim 19, wherein a distance separating adjacent TCF tapes arranged in the central region of the meshwork is constant, and a distance separating adjacent TCF tapes that are arranged in the edge region of the meshwork is also constant.

* * * * *